US008135498B2

United States Patent
Hyung et al.

(10) Patent No.: US 8,135,498 B2
(45) Date of Patent: Mar. 13, 2012

(54) METHOD AND APPARATUS FOR DETECTING MOVEMENT ERROR IN MOBILE ROBOT

(75) Inventors: Seung Yong Hyung, Yongin-si (KR); Jong Owan Kim, Hwaseong-si (KR); Jong Chang Lee, Suwon-si (KR); Jong Ho Park, Yongin-si (KR); Hyun Sik Shim, Yongin-si (KR); Kun Hak Lee, Suwon-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 468 days.

(21) Appl. No.: 12/343,653

(22) Filed: Dec. 24, 2008

(65) Prior Publication Data
US 2009/0171504 A1 Jul. 2, 2009

(30) Foreign Application Priority Data

Dec. 26, 2007 (KR) .............................. 2007-0137307

(51) Int. Cl.
*G05B 19/04* (2006.01)
*G05B 19/18* (2006.01)

(52) U.S. Cl. ........ 700/253; 700/245; 700/250; 700/254; 700/258

(58) Field of Classification Search ........................ None
See application file for complete search history.

(56) References Cited

U.S. PATENT DOCUMENTS

| 5,911,767 A * | 6/1999 | Garibotto et al. ............... 701/28 |
| 7,133,745 B2 * | 11/2006 | Wang .............................. 700/258 |
| 2006/0238156 A1* | 10/2006 | Kim ........................... 318/568.12 |
| 2007/0290828 A1* | 12/2007 | Choi et al. .................... 340/463 |
| 2008/0065267 A1* | 3/2008 | Hong et al. ................... 700/245 |
| 2009/0171504 A1* | 7/2009 | Hyung et al. ................. 700/254 |

\* cited by examiner

*Primary Examiner* — Khoi Tran
*Assistant Examiner* — Bhavesh V Amin
(74) *Attorney, Agent, or Firm* — Cha & Reiter, LLC (57) ABSTRACT

An apparatus and method for detecting movement errors due to the wheel slip or transient current generated while a mobile robot is traveling. The movement error detecting method includes: detecting movement of the wheels in a sensor part according to a movement command input to a drive motor, and outputting an actual output value from the sensor part; calculating an ideal output value for output from the sensor part as the wheels are moved according to the movement command; and comparing the actual output value with the ideal output value to determine and residual fault and detect movement errors.

16 Claims, 4 Drawing Sheets

METHOD AND APPARATUS FOR DETECTING MOVEMENT ERROR IN MOBILE ROBOT

CLAIM OF PRIORITY

This application claims priority under 35 U.S.C. §119 from an application entitled "METHOD AND APPARATUS FOR DETECTING MOVEMENT ERROR IN MOBILE ROBOT" filed in the Korean Intellectual Property Office on Dec. 26, 2007 and assigned Serial No. 2007-0137307, the contents of which are incorporated herein by reference in its entirety.

BACKGROUND OF THE INVENTION

1. Field of the Invention

The present invention relates to mobile robots and the tracking of their movement. More particularly, the present invention relates to an apparatus and method for detecting movement errors due to wheel slippage or transient current generated while a mobile robot is traveling.

2. Description of the Related Art

Mobile robots, such as cleaning robots, require precise recognition of locations while they are moving. To this end, mobile robots adopt an absolute navigation and a dead-reckoning navigation.

Absolute navigation is performed conventionally using a global positioning system (GPS). When GPS is applied to navigation in mobile robots, it allows the mobile robots to obtain an absolute position. On the other hand, GPS increases the manufacturing costs of mobile robots, and GPS use does not reduce or restrict certain errors in the position accuracy of mobile robots. In particular, since GPS cannot be used in a restricted area, such as inside building, it is difficult to apply GPS to mobile robots used indoors.

Dead-reckoning navigation, which estimates a current position based upon a previously determined position or fix, is performed using an encoder, an acceleration sensor or a gyro sensor. When dead-reckoning navigation using sensors is applied to mobile robots, it reduces the manufacturing costs of mobile robots and allows the mobile robots to calculate a precise position. On the other hand, since the position is obtained by an integral method, as the mobile robots travel further and increase their rotation movement errors increase.

In particular, when wheel slippage occurs while the mobile robot is traveling, a large positional error is generated. in addition, when the wheels cannot roll due to an obstacle, the drive motors of the wheels are overloaded (i.e., transient current flows to the driver motors), which reduces the life span of the drive motors and can even cause the driver motors to malfunction.

SUMMARY OF THE INVENTION

The present invention provides an apparatus and method for detecting movement errors due to wheel slippage and/or transient current(s) generated while a mobile robot is traveling.

In accordance with an exemplary embodiment of the present invention, the present invention provides a method and apparatus that provides a mathematical model of the dynamic characteristics of a mobile robot, and detects errors in movement of the mobile robot by comparing the input value with the output value.

In accordance with another exemplary embodiment of the present invention, the present invention provides a method for detecting movement errors in a mobile robot having wheels, including: detecting an actual movement of the wheels in a sensor part, according to a movement command input to a drive motor, and outputting an actual output value from the sensor part; calculating an ideal output value that is expected as an output from the sensor part as the wheels are normally moved according to the movement command; and comparing the actual output value with the ideal output value and detecting the movement errors.

In accordance with another exemplary embodiment of the present invention, the present invention provides an apparatus for detecting movement errors in a mobile robot having wheels, including: a sensor part for detecting an actual movement of the wheels, according to a movement command input to a drive motor of the wheels, and outputting an actual output value; an ideal output calculating unit for calculating an ideal output value that is expected to be output from the sensor part as the wheels are normally moved according to the movement command; and a movement error detecting unit for comparing the actual output value with the ideal output value and detecting the movement errors. The detecting movement or a controller may also provide an output indicating that an error has occurred.

BRIEF DESCRIPTION OF THE DRAWINGS

The features and advantages of the present invention will be more apparent from the following detailed description in conjunction with the accompanying drawings, in which.

DETAILED DESCRIPTION

Hereinafter, exemplary embodiments of the present invention are described in detail with reference to the accompanying drawings. The same reference numbers are used throughout the drawings to refer to the same or similar parts. Detailed descriptions of well-known functions and structures incorporated herein may be omitted to avoid obscuring appreciation of the subject matter of the method and apparatus for detecting movement error according to the present invention by a person of ordinary skill in the art.

Figure 1:
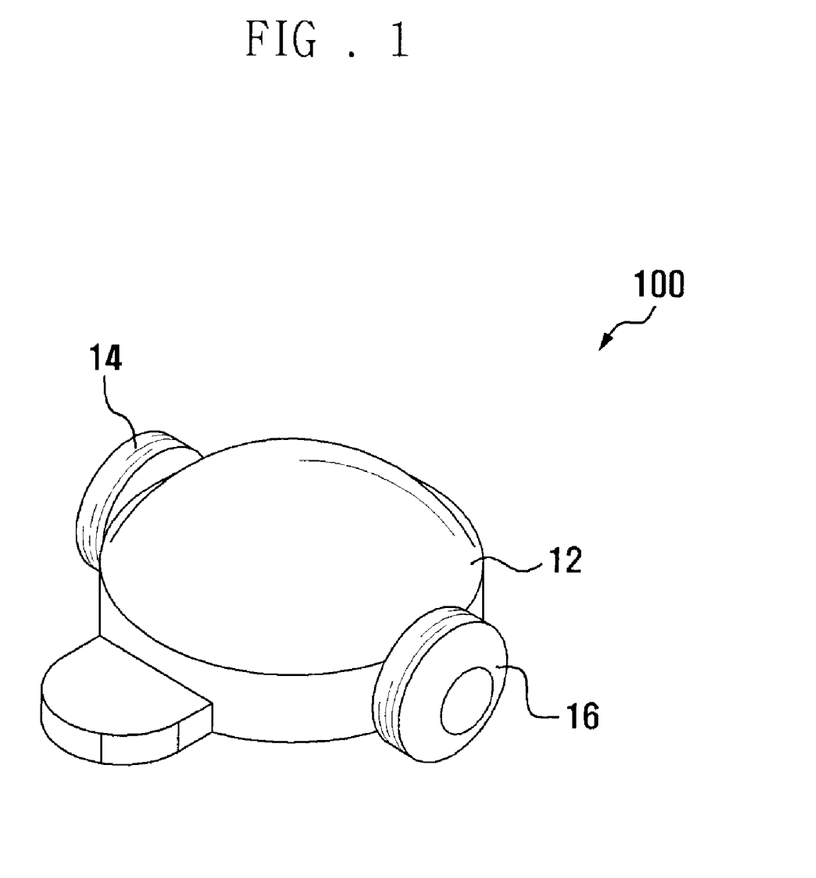
FIG. 1 is a perspective view depicting a mobile robot adapted to a movement error detecting apparatus according to an exemplary embodiment of the present invention.
Figure 2:
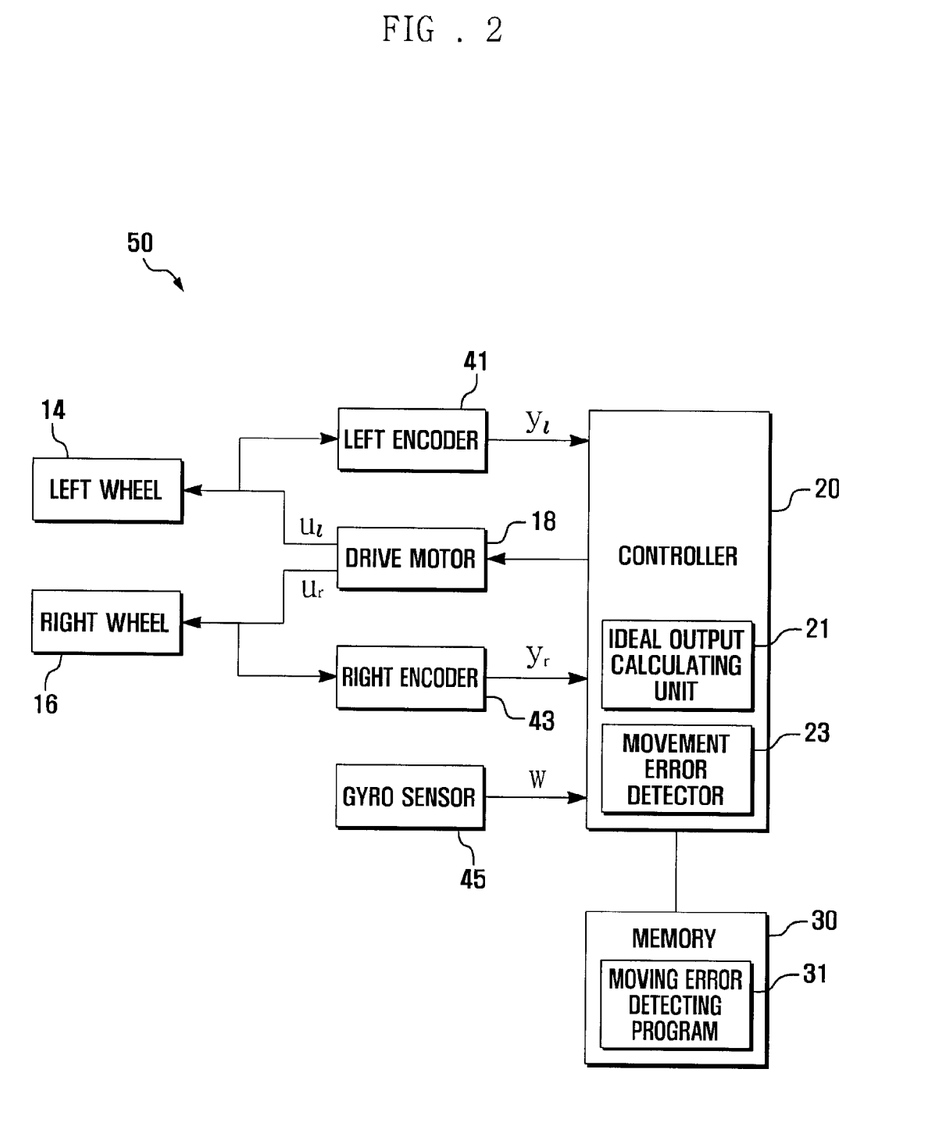
FIG. 2 is a schematic block diagram illustrating a movement error detecting apparatus according to an exemplary embodiment of the present invention.

As shown in FIG. 1 and FIG. 2, an example of a mobile robot 100 is shown that includes an apparatus for detecting movement errors 50 (FIG. 2), hereinafter called a movement error detecting apparatus 50, according to the present invention. The mobile robot 100 in this example includes a body 12 and a pair of wheels 14 and 16 installed to the body 12. A drive motor 18 (represented in FIG. 2) for driving the wheels 14 and 16 is installed within the body 12. The movement error detecting apparatus 50 includes a sensor part for detecting movement of the wheels 14 and 16 and is installed within the body 12. The sensor part includes a left encoder 41, right encoder 43 and a gyro sensor 45.

The wheels 14 and 16 are installed at both outer lateral sides of the body 2 in this exemplary embodiment of the present invention shown in FIG. 1. However, it should be understood that the present invention is not limited by the exemplary embodiment. For example, the wheels 14 and 16 may be installed underneath the body 12 or installed in such a way so as to extend from the underside to the upper side of the body 12.

The movement error detecting apparatus 50 includes a controller 20, memory 30 and sensor part.

The controller 20 may comprise, for example, a microprocessor that controls the whole operation of the mobile robot 100, including the movement error detecting apparatus 50. The controller 20 controls the movement of the mobile robot 100 and detects movement errors generated while the mobile robot 100 is traveling.

The left wheel 14 and right wheel 16 are connected to the drive motor 18. The drive motor 18 may rotate the left and right wheels 14 and 16 according to the movement commands $u_l$ and $u_r$ from the controller 20, where $u_l$ is a movement command for the left wheel 14 and $u_r$ is a movement command for the right wheel 16. The drive motor 18 may be a DC motor and inputs the movement commands $u_l$ and $u_r$ generated by pulse width modulation (PWM). The memory 30 stores a program for controlling the operation of the mobile robot 100 and data generated while the program is executed. The memory 30 may include more than one volatile memory device and non-volatile memory device. The memory 30 also stores a movement error detecting program 31 for detecting movement errors and data generated while the movement error detecting program 31 is executed.

Referring now to FIG. 2, the sensor part detects the actual movement of the wheels 14 and 16 that are moved according to the movement commands $u_l$ and $u_r$ input to the drive motor 18 and then outputs actual output values $y_l$, $y_r$ and w to the controller 20. The left encoder 41, which is connected to the shaft of the left wheel 14, detects the rotation of the left wheel 14 and outputs the detected result to the controller 20. The right encoder 43, which is connected to the shaft of the right wheel 16, detects the rotation of the right wheel 16 and outputs the detected result to the controller 20. The gyro sensor 45 detects the rotation of the mobile robot 100 and outputs the detected result to the controller 20. The left and right encoders 41 and 43 output the rotational velocities and linear velocities, in proportion to the rotation number of the wheels 14 and 16, to the controller 20. The controller 20 integrates the output values to calculate the position of the mobile robot 100. The gyro sensor 45 detects the rotation of the mobile robot 100 and outputs an angular velocity to the controller 20. The controller 20 integrates the output value to calculate the movement direction of the mobile robot 100. Here, $y_l$ is the output value of the left encoder 41, $y_r$ is the output value of the right encoder 43 and w is the output value of the gyro sensor 45.

In particular, the controller 20 includes an ideal output calculating unit 21 and the movement error detector 23. The ideal output calculating unit 21 calculates an ideal output value that is intended (i.e. expected/predicted) to be output from the sensor part as the wheels 14 and 16 are normally moved according to the movement commands $u_l$ and $u_r$. The movement error detector 23 compares the actual output value with the ideal output value to detect whether a movement error has occurred.

The ideal output calculating unit 21 calculates the ideal output value by the following Equation 1.

$$\begin{bmatrix} \dot{\hat{v}}_l \\ \dot{\hat{v}}_r \end{bmatrix} = \begin{bmatrix} a_{11} & a_{12} \\ a_{21} & a_{22} \end{bmatrix} \begin{bmatrix} \hat{v}_l \\ \hat{v}_r \end{bmatrix} + \begin{bmatrix} b_{11} & b_{12} \\ b_{21} & b_{22} \end{bmatrix} \begin{bmatrix} u_l \\ u_r \end{bmatrix} \quad \text{[Equation 1]}$$

$$\begin{bmatrix} \hat{y}_l \\ \hat{y}_r \\ \hat{w} \end{bmatrix} = \begin{bmatrix} 1 & 0 \\ 0 & 1 \\ -2/l & 2/l \end{bmatrix} \begin{bmatrix} \hat{v}_l \\ \hat{v}_r \end{bmatrix}$$

wherein $v_l$ denotes the left wheel velocity, $v_r$ denotes the right wheel velocity, $u_l$ denotes the movement command for the left wheel, $u_r$ denotes the movement command for the right wheel, a and b denote system parameters, $y_l$ denotes the output value of the left encoder, $y_r$ denotes the output value of the right encoder, w denotes the angular velocity of the gyro sensor, and l denotes the distance between the left and right wheels.

Equation 1 is a state space equation that expresses a mathematical model of the mobile robot 100. In other words, the dynamic systems including the mobile robot 100 may be all expressed through a state space equation. Equation 1 is a specific mathematical model that is obtained by analyzing the dynamic characteristics of the mobile robot 100 from a general state space equation.

More specifically, the mathematical model is a state space equation obtained as input and output data are collected through various operations of the mobile robot 100, and parameters are then extracted from the collected input and output data through the least square method. In order to obtain a precise mathematical model, output data should be acquired though the input of a variety of frequency bands. A mathematical model comprises a system for predicting output values $y_l$, $y_r$ and w, serving as a function that associates an output to movement commands $u_l$ and $u_r$ that are input to the mobile robot 100 in a certain state. This mathematical model typically is not precisely consistent with the actual model in all cases. However, the mathematical model can specify that it is effective within a certain range of error for extracted parameters. After the above described processes are performed, Equation 1 as a mathematical model is obtained. Since the mobile robot 100 according to an exemplary embodiment of the present invention moves using the two wheels 14 and 16, it is analyzed as a multi-input multi-output system. Therefore, the mobile robot 100 can be expressed by a state space equation that inputs two movement command $u_l$ and $u_r$ and outputs three output values $y_l$, $y_r$ and w. Here, $u_l$ is a movement command of the left wheel and $u_r$ is a movement command of the right wheel 16. $y_l$ is an output value of the left encoder 41, $y_r$ is an output value of the right encoder 43 and w is an angular velocity of the gyro sensor 45. In that case, although the state space equation is a non-linear system, it can be linearized in the vicinity of the operating point, thereby obtaining Equation 1.

In a case where, for example, a slip occurs at the left wheel 14, the mobile robot 100 does not react in a normal state where its input and output operations are normally conducted, but operates in such a way to output different output values. Since the coefficient of dynamic friction is smaller than that of static friction, the system parameters are varied and the state space equation is expressed as the following Equation 2.

$$\begin{bmatrix} \dot{v}_l \\ \dot{v}_r \end{bmatrix} = \begin{bmatrix} a_{11} + \Delta a_{11} & a_{12} + \Delta a_{12} \\ a_{21} & a_{22} \end{bmatrix} \begin{bmatrix} v_l \\ v_r \end{bmatrix} + \quad \text{[Equation 2]}$$
$$\begin{bmatrix} b_{11} + \Delta b_{11} & b_{12} + \Delta b_{12} \\ b_{21} & b_{22} \end{bmatrix} \begin{bmatrix} u_l \\ u_r \end{bmatrix} + \begin{bmatrix} f_1 \\ 0 \end{bmatrix}$$
$$= \begin{bmatrix} a_{11} & a_{12} \\ a_{21} & a_{22} \end{bmatrix} \begin{bmatrix} v_l \\ v_r \end{bmatrix} + \begin{bmatrix} b_{11} & b_{12} \\ b_{21} & b_{22} \end{bmatrix} \begin{bmatrix} u_l \\ u_r \end{bmatrix} +$$
$$\begin{bmatrix} \Delta a_{11} v_l + \Delta a_{12} v_r + \Delta b_{11} u_l + \Delta b_{12} u_r + f_1 \\ 0 \end{bmatrix}$$

$$\begin{bmatrix} y_l \\ y_r \\ w \end{bmatrix} = \begin{bmatrix} 1 & 0 \\ 0 & 1 \\ -2/l & 2/l \end{bmatrix} \begin{bmatrix} v_l \\ v_r \end{bmatrix}$$

wherein $\Delta a$, $\Delta b$ and f are errors generated at respective parameters.

When such movement errors have occurred, the different outputs ($y_l$, $y_r$, and w) to the same movement commands $u_l$ and $u_r$ are output, as expressed in Equations 1 and 2.

The movement error detecting unit 23 (shown in FIG. 2 as part of controller 20) detects the movement errors through the difference in value between the actual output value and the ideal output value, which is hereinafter called a fault residual. That is, the movement error can be detected by the difference between the actual output value, output from the sensor part according to the movement of the mobile robot 100, and the ideal output value calculated by Equation 1.

On the other hand, since the actual output value can be expressed by Equation 2, the fault residual is expressed by the following Equation 3. Equation 3 can be obtained by taking the Laplace transform of Equations 1 and 2.

$$\begin{bmatrix} y_l - \hat{y}_l \\ y_r - \hat{y}_r \\ w - \hat{w} \end{bmatrix} = \begin{bmatrix} 1 & 0 \\ 0 & 1 \\ -2/l & 2/l \end{bmatrix} \left( sI - \begin{bmatrix} a_{11} & a_{12} \\ a_{21} & a_{22} \end{bmatrix} \right)^{-1} \quad \text{[Equation 3]}$$
$$\begin{bmatrix} \Delta a_{11} v_l + \Delta a_{12} v_r + \Delta b_{11} u_l + \Delta b_{12} u_r + f_1 \\ 0 \end{bmatrix}$$

wherein s is the Laplace variable.

Figure 4:
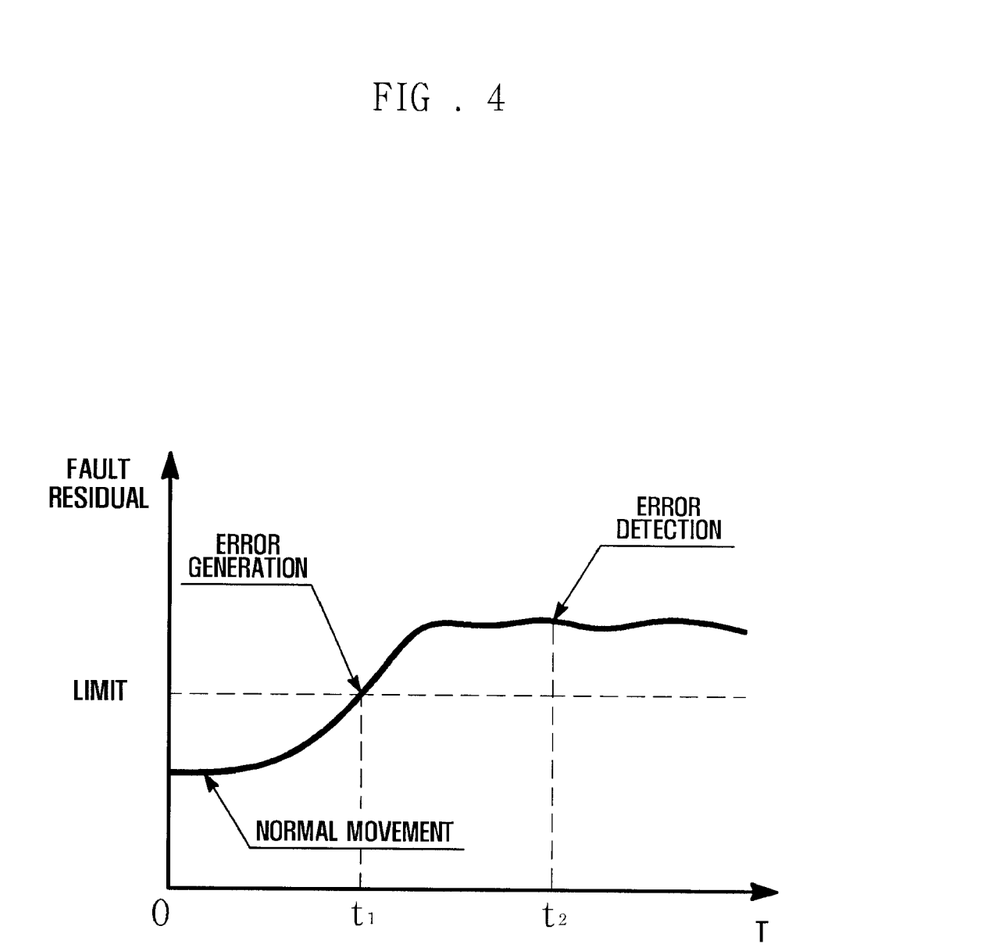
FIG. 4 is a fault residual-time graph calculated according to the movement error detecting method of FIG. 3.

As shown in the graph in FIG. 4, the movement error detecting unit 23 detects a movement error through the fault residual calculated by Equation 3. That is, when the fault residual is close to "zero", the movement error detecting unit 23 concludes that the whole operation of the mobile robot 100 is normal.

On the contrary, according to this exemplary embodiment of the present invention, when the fault residual exceeds a certain limit, the movement error detecting unit 23 determines that a movement error has occurred. Furthermore, when an error duration, during which the limit exceeds, exceeds a time limit t2-t1, the movement error detecting unit 23 also determines that a movement error has occurred.

The movement error detecting unit 23 performs the detection of a movement error through the limit and the error duration. In the case where the mathematical model is significantly different from the actual model, the limit must be selected as a larger value. When a large amount of noise is generated in the sensor part, the time limit t2-t1 must be also selected as a large value. That is, it is preferable that the limit is adjusted in proportion to the difference between the actual output value and the output value calculated by Equation 2 and the time limit is also adjusted in proportion to the amount of noises generated in the sensor part.

Equations 2 and 3 express an exemplary case where a slip occurs at the left wheel 14 of the mobile robot 100. However, the wheel slip can, in general, be expressed by the following Equations 4 and 5.

$$\begin{bmatrix} \dot{v}_l \\ \dot{v}_r \end{bmatrix} = \begin{bmatrix} a_{11} + \Delta a_{11} & a_{12} + \Delta a_{12} \\ a_{21} + \Delta a_{21} & a_{22} + \Delta a_{22} \end{bmatrix} \begin{bmatrix} v_l \\ v_r \end{bmatrix} + \quad \text{[Equation 4]}$$
$$\begin{bmatrix} b_{11} + \Delta b_{11} & b_{12} + \Delta b_{12} \\ b_{21} + \Delta b_{21} & b_{22} + \Delta b_{22} \end{bmatrix} + \begin{bmatrix} f_1 \\ 0 \end{bmatrix}$$
$$= \begin{bmatrix} a_{11} & a_{12} \\ a_{21} & a_{22} \end{bmatrix} \begin{bmatrix} v_l \\ v_r \end{bmatrix} + \begin{bmatrix} b_{11} & b_{12} \\ b_{21} & b_{22} \end{bmatrix} \begin{bmatrix} u_l \\ u_r \end{bmatrix} +$$
$$\begin{bmatrix} \Delta a_{11} v_l + \Delta a_{12} v_r + \Delta b_{11} u_l + \Delta b_{12} u_r + \Delta f_1 \\ \Delta a_{21} v_l + \Delta a_{22} v_r + \Delta b_{21} u_l + \Delta b_{22} u_r + \Delta f_2 \end{bmatrix}$$

$$\begin{bmatrix} y_l \\ y_r \\ w \end{bmatrix} = \begin{bmatrix} 1 & 0 \\ 0 & 1 \\ -2/l & 2/l \end{bmatrix} \begin{bmatrix} v_l \\ v_r \end{bmatrix}$$

Wherein $\Delta a$, $\Delta b$ and f are errors generated at respective parameters.

$$\begin{bmatrix} y_l - \hat{y}_l \\ y_r - \hat{y}_r \\ w - \hat{w} \end{bmatrix} = \begin{bmatrix} 1 & 0 \\ 0 & 1 \\ -2/l & 2/l \end{bmatrix} \left( sI - \begin{bmatrix} a_{11} & a_{12} \\ a_{21} & a_{22} \end{bmatrix} \right)^{-1} + \quad \text{[Equation 5]}$$
$$\begin{bmatrix} \Delta a_{11} v_l + \Delta a_{12} v_r + \Delta b_{11} u_l + \Delta b_{12} u_r + \Delta f_1 \\ \Delta a_{21} v_l + \Delta a_{22} v_r + \Delta b_{21} u_l + \Delta b_{22} u_r + \Delta f_2 \end{bmatrix}$$

wherein s is the Laplace variable.

In particular, the element, $\Delta a_{21} v_l + \Delta a_{22} v_r + \Delta b_{21} u_l + \Delta b_{22} u_r + f_2$ in Equation 4, is related to the movement error of the right wheel 16, and becomes zero when the right wheel 16 is normally operated. That is, Equation 2 for the movement error of the left wheel 14 can be derived from Equation 4.

As described in Equation 5, the fault residual is a vector. The magnitude of the vector is extracted for the limit in order to detect the movement error and the direction of the vector shows which type of movement error has occurred. That is, since the movement error detecting apparatus 50 has the left encoder 41, right encoder 43 and gyro sensor 45, which are all independent from each other, it can analyze the calculated vector and classify the types of movement errors, and detect the movement errors.

For example, when one of the left encoder 41, right encoder 43 and gyro sensor 45 malfunctions, the fault residuals of the left encoder 41, right encoder 43 and gyro sensor 45 are expressed as $$\begin{bmatrix} X \\ 0 \\ 0 \end{bmatrix}, \begin{bmatrix} 0 \\ X \\ 0 \end{bmatrix}, \text{and} \begin{bmatrix} 0 \\ 0 \\ X \end{bmatrix}$$

correspondingly and respectively.

When a wheel slips or does not roll due to an obstacle, all components are not consistent between the ideal output value and the actual output value and thus the fault residual is expressed as $$\begin{bmatrix} x_1 \\ x_2 \\ x_3 \end{bmatrix}.$$

Figure 3:
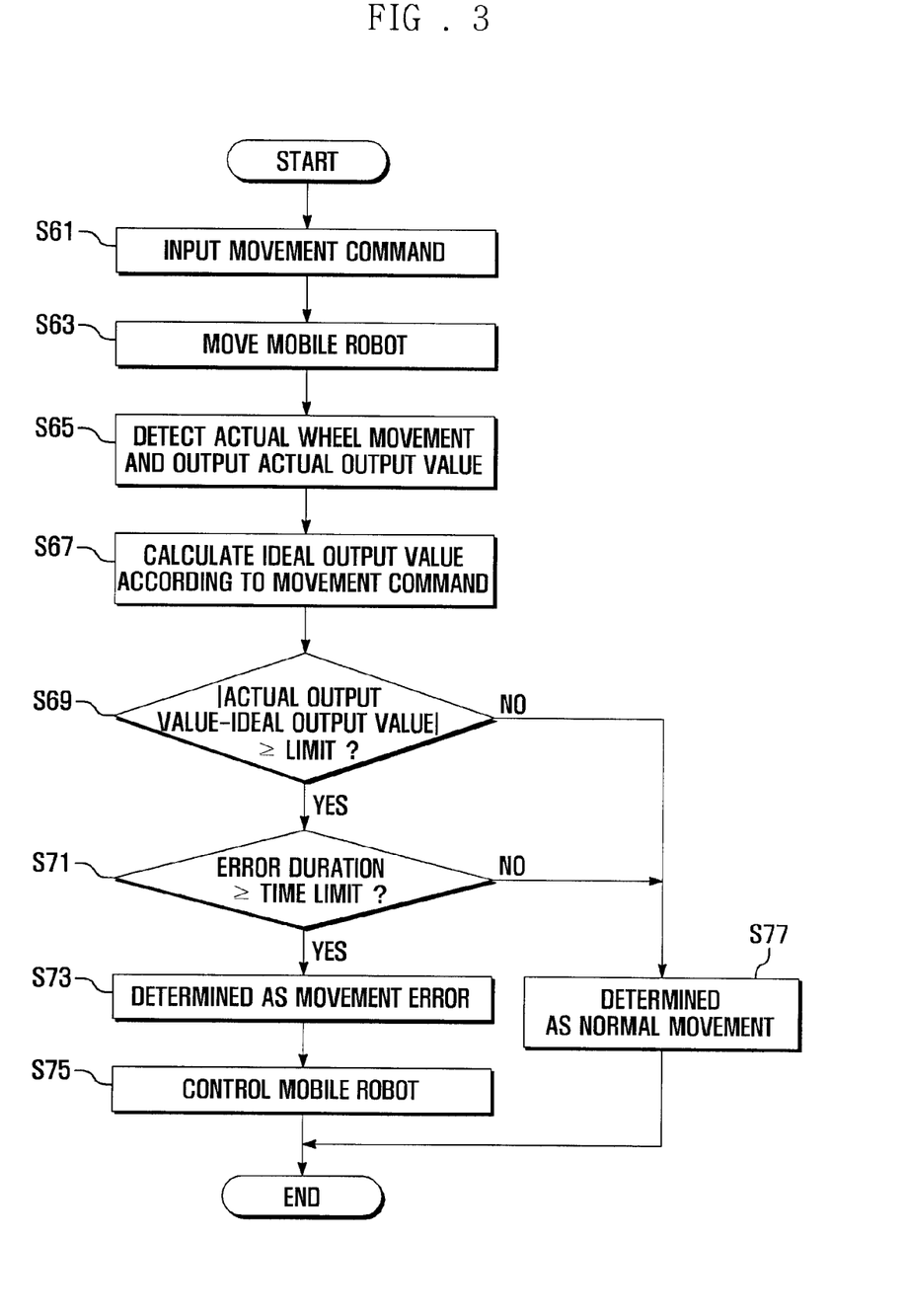
FIG. 3 is a flow chart illustrating exemplary steps of a method for detecting a movement error in a movement error detecting apparatus of FIG. 2.

The movement error detecting method according to an exemplary embodiment of the present invention is described in detail with reference to FIG. 1 to FIG. 4. In particular, FIG. 3 is a flow chart describing an example of the movement error detecting method that is adapted to the movement error detecting apparatus of FIG. 2.

With reference to FIG. 2, when the controller 20 inputs movement commands $u_l$ and $u_r$ to the drive motor 18 (S61), the drive motor 18 rotates the left and right wheels 14 and 16 so that the mobile robot 100 is moved (S63).

The sensor part detects the actual movement of the wheels 14 and 16 and outputs the actual output value to the controller 20 (S65). That is, the left encoder 41 outputs the rotational velocity and linear velocity, in proportion to the rotational number of the left wheel 14, to the controller 20. Similarly, the right encoder 43 outputs the rotational velocity and linear velocity, in proportion to the rotation number of the right wheel 16, to the controller 20. The gyro sensor 45 detects the rotation of the mobile robot 100 and outputs the angular velocity to the controller 20. The controller 20 integrates the output values output from the sensor part and calculates the position and moving direction of the mobile robot 100.

After that, the ideal output calculating unit 21 calculates an ideal output value according to the movement commands $u_l$ and $u_r$ input to the drive motor 18 (S67). The ideal output value may be calculated through Equation 1. However, it should be understood that it is within the spirit and scope of the claimed invention that the ideal output value could be calculated prior to, simultaneously, or overlapping with the input of the movement commands to the drive motor.

The movement error detecting unit 23 determines whether the fault residual, a difference between the actual output value and the ideal output value, exceeds the limit (S69). The fault residual may be calculated by Equation 5.

When the fault residual exceeds the limit at S69, the movement error detecting unit 23 determines whether the error duration, during which the limit exceeds, exceeds a time limit (S71).

When the error duration exceeds a time limit at S71, the movement error detecting unit 23 determines that a movement error has occurred (S73). The controller 20 controls the movement of the mobile robot 100 according to the detected movement error (S75). For example, when detecting a movement error, the controller 20 may provide a warning by sounding an alarm, flashing a light, interrupting inputting the movement commands $u_l$ and $u_r$ to the drive motor 18 to temporarily suspend the movement of the mobile robot 100. It is also possible that the type or severity of the error could be ranked and relatively less serious one could be stored in the memory 30 for future retrieval. On the contrary, when the fault residual does not exceed the limit at S69 or when the error duration does not exceed a time limit at S71, the movement error detecting unit 23 concludes that the mobile robot 100 has moved normally (S77).

As described in the above examples, the method and apparatus according to the present invention may produce a mathematical model of the dynamic characteristics of a mobile robot and detect movement errors by comparing the actual output value with the ideal output value. The method and apparatus according to the present invention can detect movement errors through the software approach without the addition of hardware elements, overcoming costs associated with the addition of hardware, and preventing system complexity from being increased due to further changes in the hardware design, thereby enhancing the reliability of mobile robot.

Although exemplary embodiments of the present invention have been described in detail hereinabove, it should be understood that many variations and modifications of the basic inventive concept herein described, which may be apparent to those skilled in the art, will still fall within the spirit and scope of the exemplary embodiments of the present invention as defined in the appended claims. For example, a person of ordinary skill in the art should appreciate that only one of the wheels may be a drive wheel, or it is possible that each wheel is a drive wheel having has a separate drive motor. Also, it is within the spirit and scope of the claimed invention that the mobile robot may include tractor or tank treads in addition to or in lieu of wheels.

What is claimed is:

1. A method, operable in a controller, for determining detecting a movement error in a mobile robot comprising a sensor part and at least one wheel, the method comprising:
   sensing a movement of the mobile robot according to a movement command, corresponding to a rotation number of the at least one wheel and a movement direction of the mobile robot;
   outputting an actual-movement value corresponding to the movement of the mobile robot from the sensor part;
   calculating an ideal movement value predicted as an ideal movement of the mobile robot according to the movement command;
   comparing the actual movement value with the ideal movement value; and
   detecting the movement error as the compared result,
   wherein detecting the movement error comprises:
       determining that the movement error has occurred when the calculated difference exceeds a limit and when an error duration during which the limit exceeds, exceeds a time limit.

2. The method of claim 1, wherein the sensor part comprises at least one of an encoder and a gyro sensor.

3. The method of claim 1, wherein:
   sensing a movement of the mobile robot comprises:
       detecting movement of a left wheel and a right wheel, and wherein said left wheel and said right wheel are spaced apart from each other at a predetermined distance; and
   the sensing a movement of the mobile robot by the sensor part comprises:
   detecting a rotation of the left wheel by a left encoder;
   detecting a rotation of the right wheel by a right encoder; and
   detecting a rotation of the mobile robot by a gyro sensor.

4. The method of claim 3, wherein the ideal movement value is calculated as:

$$\begin{bmatrix} \dot{\hat{v}}_l \\ \dot{\hat{v}}_r \end{bmatrix} = \begin{bmatrix} a_{11} & a_{12} \\ a_{21} & a_{22} \end{bmatrix} \begin{bmatrix} \hat{v}_l \\ \hat{v}_r \end{bmatrix} + \begin{bmatrix} b_{11} & b_{12} \\ b_{21} & b_{22} \end{bmatrix} \begin{bmatrix} u_l \\ u_r \end{bmatrix}$$

$$\begin{bmatrix} \hat{y}_l \\ \hat{y}_r \\ \hat{w} \end{bmatrix} = \begin{bmatrix} 1 & 0 \\ 0 & 1 \\ -2/l & 2/l \end{bmatrix} \begin{bmatrix} \hat{v}_l \\ \hat{v}_r \end{bmatrix}$$

wherein
$v_1$ denotes a left wheel velocity,
$v_2$ denotes a right wheel velocity,
$u_l$ denotes a movement command for the left wheel,
$u_r$ denotes a movement command for the right wheel,
a and b denote system parameters,
$y_l$ denotes an output value of the left encoder,
$y_r$ denotes an output value of the right encoder,
w denotes an angular velocity of the gyro sensor, and
l denotes a distance between the left and right wheels.

5. The method of claim 4, wherein the calculated actual movement value is calculated as:

$$\begin{bmatrix} \dot{v}_l \\ \dot{v}_r \end{bmatrix} = \begin{bmatrix} a_{11}+\Delta a_{11} & a_{12}+\Delta a_{12} \\ a_{21} & a_{22} \end{bmatrix} \begin{bmatrix} v_l \\ v_r \end{bmatrix} + \begin{bmatrix} b_{11}+\Delta b_{11} & b_{12}+\Delta b_{12} \\ b_{21} & b_{22} \end{bmatrix} \begin{bmatrix} u_l \\ u_r \end{bmatrix} + \begin{bmatrix} f_1 \\ 0 \end{bmatrix}$$

$$= \begin{bmatrix} a_{11} & a_{12} \\ a_{21} & a_{22} \end{bmatrix} \begin{bmatrix} v_l \\ v_r \end{bmatrix} + \begin{bmatrix} b_{11} & b_{12} \\ b_{21} & b_{22} \end{bmatrix} \begin{bmatrix} u_l \\ u_r \end{bmatrix} + \begin{bmatrix} \Delta a_{11} v_l + \Delta a_{12} v_r + \Delta b_{11} u_l + \Delta b_{12} u_r + f_1 \\ 0 \end{bmatrix}$$

$$\begin{bmatrix} y_l \\ y_r \\ w \end{bmatrix} = \begin{bmatrix} 1 & 0 \\ 0 & 1 \\ -2/l & 2/l \end{bmatrix} \begin{bmatrix} v_l \\ v_r \end{bmatrix}$$

wherein $\Delta a$, $\Delta b$ and f are errors generated at respective parameters.

6. The method of claim 5, wherein determining the movement error is expressed as $$\begin{bmatrix} y_l - \hat{y}_l \\ y_r - \hat{y}_r \\ w - \hat{w} \end{bmatrix} = \begin{bmatrix} 1 & 0 \\ 0 & 1 \\ -2/l & 2/l \end{bmatrix} \left( sI - \begin{bmatrix} a_{11} & a_{12} \\ a_{21} & a_{22} \end{bmatrix} \right)^{-1}$$

$$\begin{bmatrix} \Delta a_{11} v_l + \Delta a_{12} v_r + \Delta b_{11} u_l + \Delta b_{12} u_r + f_1 \\ 0 \end{bmatrix}$$

wherein s is the Laplace variable.

7. The method of claim 1, wherein:
the limit is adjusted in proportion to a difference between the actual movement value and the calculated actual movement value.

8. An apparatus for detecting a movement error in a mobile robot comprising a left wheel and a right wheel separated by a predetermined difference; the apparatus comprising:
a sensor part for sensing a movement of the mobile robot according to a movement command, corresponding to a rotation number of at least one of the left wheel and the right wheel and a movement direction of the mobile robot, said sensor part outputting an actual movement value corresponding to the movement of the mobile robot;
an ideal output calculating unit for calculating an ideal movement value predicted for the mobile robot according to the movement command; and
a movement error detecting unit for:
comparing the actual movement value with the ideal movement value; and
detecting the movement error as the compared result, wherein detecting the movement error comprises:
determining that the movement error has occurred when the calculated difference exceeds a limit and when an error duration during which the limit exceeds, exceeds a time limit.

9. The apparatus of claim 8, wherein the sensor part comprises at least one of an encoder and a gyro sensor.

10. The apparatus of claim 8, wherein:
the sensor part comprises:
a left encoder for detecting a rotation of the left wheel;
a right encoder for detecting a rotation of the right wheel; and
a gyro sensor for detecting a rotation of the mobile robot.

11. The apparatus of claim 10, wherein the ideal movement value is calculated as $$\begin{bmatrix} \dot{\hat{v}}_l \\ \dot{\hat{v}}_r \end{bmatrix} = \begin{bmatrix} a_{11} & a_{12} \\ a_{21} & a_{22} \end{bmatrix} \begin{bmatrix} \hat{v}_l \\ \hat{v}_r \end{bmatrix} + \begin{bmatrix} b_{11} & b_{12} \\ b_{21} & b_{22} \end{bmatrix} \begin{bmatrix} u_l \\ u_r \end{bmatrix}$$

$$\begin{bmatrix} \hat{y}_l \\ \hat{y}_r \\ \hat{w} \end{bmatrix} = \begin{bmatrix} 1 & 0 \\ 0 & 1 \\ -2/l & 2/l \end{bmatrix} \begin{bmatrix} \hat{v}_l \\ \hat{v}_r \end{bmatrix}$$

wherein $v_l$ denotes a left wheel velocity, $v_r$ denotes a right wheel velocity, $u_l$ denotes a movement command for the left wheel, $u_r$ denotes a movement command for the right wheel, a and b denote system parameters, $y_l$ denotes an output value of the left encoder, $y_r$ denotes an output value of the right encoder, w denotes an angular velocity of the gyro sensor, and l denotes a distance between the left and right wheels.

12. The apparatus of claim 11, wherein the calculated actual movement value is calculated as:

$$\begin{bmatrix} \dot{v}_l \\ \dot{v}_r \end{bmatrix} = \begin{bmatrix} a_{11}+\Delta a_{11} & a_{12}+\Delta a_{12} \\ a_{21} & a_{22} \end{bmatrix} \begin{bmatrix} v_l \\ v_r \end{bmatrix} + \begin{bmatrix} b_{11}+\Delta b_{11} & b_{12}+\Delta b_{12} \\ b_{21} & b_{22} \end{bmatrix} \begin{bmatrix} u_l \\ u_r \end{bmatrix} + \begin{bmatrix} f_1 \\ 0 \end{bmatrix}$$

$$= \begin{bmatrix} a_{11} & a_{12} \\ a_{21} & a_{22} \end{bmatrix} \begin{bmatrix} v_l \\ v_r \end{bmatrix} + \begin{bmatrix} b_{11} & b_{12} \\ b_{21} & b_{22} \end{bmatrix} \begin{bmatrix} u_l \\ u_r \end{bmatrix} + \begin{bmatrix} \Delta a_{11} v_l + \Delta a_{12} v_r + \Delta b_{11} u_l + \Delta b_{12} u_r + f_1 \\ 0 \end{bmatrix}$$

$$\begin{bmatrix} y_l \\ y_r \\ w \end{bmatrix} = \begin{bmatrix} 1 & 0 \\ 0 & 1 \\ -2/l & 2/l \end{bmatrix} \begin{bmatrix} v_l \\ v_r \end{bmatrix}$$

wherein $\Delta a$, $\Delta b$ and f are errors generated at respective parameters.

13. The apparatus of claim 12, wherein the movement error detecting unit determines the movement error as:

$$\begin{bmatrix} y_l - \hat{y}_l \\ y_r - \hat{y}_r \\ w - \hat{w} \end{bmatrix} = \begin{bmatrix} 1 & 0 \\ 0 & 1 \\ -2/l & 2/l \end{bmatrix} \left( sI - \begin{bmatrix} a_{11} & a_{12} \\ a_{21} & a_{22} \end{bmatrix} \right)^{-1}$$

$$\begin{bmatrix} \Delta a_{11} v_l + \Delta a_{12} v_r + \Delta b_{11} u_l + \Delta b_{12} u_r + f_1 \\ 0 \end{bmatrix}$$

wherein s is the Laplace variable.

14. The apparatus of claim 8, wherein:
the limit is adjusted in proportion to the difference between the actual movement value and the calculated actual movement value.

15. The apparatus of claim 8, wherein the time limit is adjusted in proportion to an amount of noise generated in the sensor part.

16. The method of claim 1, wherein the time limit is adjusted in proportion to an amount of noise generated in the sensor part.

* * * * *